(12) United States Patent
Vahdat et al.

(10) Patent No.: US 8,867,915 B1
(45) Date of Patent: Oct. 21, 2014

(54) DYNAMIC DATA CENTER NETWORK WITH OPTICAL CIRCUIT SWITCH

(75) Inventors: Amin Vahdat, Los Altos, CA (US); Xiaoxue Zhao, Fremont, CA (US); Paul Germano, San Francisco, CA (US); Bikash Koley, Sunnyvale, CA (US); Hong Liu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 307 days.

(21) Appl. No.: 13/342,784

(22) Filed: Jan. 3, 2012

(51) Int. Cl.
*H04J 14/00* (2006.01)
(52) U.S. Cl.
USPC .......................................................... 398/55
(58) Field of Classification Search
USPC .......................................................... 398/55
See application file for complete search history.

(56) References Cited

U.S. PATENT DOCUMENTS

| | | | | |
|---|---|---|---|---|
| 8,121,478 | B2 * | 2/2012 | Kash et al. ....................... | 398/50 |
| 2009/0257709 | A1 * | 10/2009 | Dames ............................. | 385/20 |
| 2012/0008945 | A1 * | 1/2012 | Singla et al. .................... | 398/49 |

OTHER PUBLICATIONS

G. Wang et al., "Your Data Center is a Router: The Case for Reconfigurable Optical Circuit Switched Paths", Carnegie Mellon University, Oct. 2009.*
M. Glick et al., "Dynamically Reconfigurable Optical Links for High-Bandwidth Data Center Networks", OFC, 2009.*
"Data Center Networking—Connectivity and Topology Design Guide", Enterasys, 2011.*
VL2: A Scalable and Flexible Data Center Network, SIGCOMM'09, Aug. 17-21, 2009, Barcelona, Spain, 12 pages.
c-Through: Part-time Optics in Data Centers, SIGCOMM'10, Aug. 30-Sep. 3, 2010, New Delhi, India, 12 pages.
Helios: A Hybrid Electrical/Optical Switch Architecture for Modular Data Centers, SIGCOMM'10, Aug. 30-Sep. 3, 2010, New Delhi, India, 12 pages.
BCube: A High Performance, Server-centric Network Architecture for Modular Date Centers, SIGCOMM'09, Aug. 17-21, 2009, Barcelona, Spain, 12 pages.
DCell: A scalable and Fault-Tolerant Network Structure for Data Centers, SIGCOMM'08, Aug. 17-22, 2008, Seattle, Washington, USA, 12 pages.
Scale-Out Networking in the Data Center, Jul./Aug. 2010, 13 pages.
Flattened Butterfly: A Cost-Efficient Topology for High-Radix Networks, ISCA'07, Jun. 0-13, 2007, San Diego, California, USA, 12 pages.
The Emerging Optical Data Center, 2011 Optical Society of America, 3 pages.

* cited by examiner

*Primary Examiner* — Shi K Li
(74) *Attorney, Agent, or Firm* — Foley & Lardner LLP; Edward A. Gordon

(57) ABSTRACT

A system and method of providing a dynamic optical network topology according to topology determinations made by a network control is disclosed. The system and method includes optical ports on an optical circuit switch system operably connected to a plurality of server groups, and optical ports on the optical circuit switch system operably connected to a plurality of packet processing nodes. The system and method also includes at least one memory and at least one processor to execute network control software to receive input comprising a bandwidth request, determine an output comprising a preferred optical link topology for the optical circuit switch system based on the received input, convert the optical link topology for the optical circuit switch system into optical circuit switch port mapping, and send the optical circuit switch port mapping to the optical circuit switch system and to the packet processing nodes.

12 Claims, 6 Drawing Sheets

DYNAMIC DATA CENTER NETWORK WITH OPTICAL CIRCUIT SWITCH

BACKGROUND

Cloud computing and its applications are effecting a qualitative shift in the way people communicate and share information. The underlying computer networks that support cloud computing can be divided into two major categories: intra-datacenter and inter-datacenter. Intra-datacenter network interconnects the computing infrastructure (servers, disks) within the same building or among different buildings of a datacenter campus; while inter-datacenter network refers to connections from metropolitan to long-haul reach interconnecting multiple datacenters distributed at different geographic locations. Many modern high-speed data links use optical transmission technologies via optical fibers for both intra- and inter-datacenter networks.

Today, most of the actual computing and storage underlying the Internet and cloud computing takes place in warehouse-scale data center buildings. Similarly, most of the long-haul links transferring data and requests back and forth between end users and data centers are switched through Internet points of presence (POP). Both environments must transfer a tremendous amount of data between individual computers and the switches and routers responsible for getting the data to its destination. Current data centers contain predetermined topology structures for switching and interconnecting Internet data to determine a given destination.

SUMMARY OF THE DISCLOSED EMBODIMENTS

According to one example embodiment, an optical circuit switch system that provides a dynamic optical link topology according to topology determinations made by a network control module is disclosed. The system includes optical ports on the optical circuit switch system operably connected to a plurality of server groups, optical ports on the optical circuit switch system operably connected to a plurality of packet processing nodes, and at least one computing device comprising at least one memory and at least one processor to execute network control software stored in the at least one memory. The network control software provides instructions to receive input comprising a bandwidth request, determine an output comprising a preferred optical network topology for the optical circuit switch system based on the received input, convert the optical link topology for the optical circuit switch system into optical circuit switch port mapping, and send the optical circuit switch port mapping to the optical circuit switch system and to the packet processing nodes.

According to another example embodiment, a method of determining a dynamic optical link topology for an optical circuit switch system in a data center is disclosed. The method includes receiving an input comprising a bandwidth request from at least one server operably connected to the optical circuit switch system, determining an output comprising a preferred optical link topology for the optical circuit switch system based on the received input, converting the optical link topology for the optical circuit switch system into optical circuit switch port mapping, and sending the optical circuit switch port mapping to the optical circuit switch system and to a plurality of packet processing nodes operably connected to the optical circuit switch system.

According to yet another embodiment, a computer-readable media with machine-executable instructions stored thereon and when executed by one or more processors that implements a method is disclosed. The method includes receiving an input comprising a bandwidth request from at least one server operably connected to the optical circuit switch system, determining an output comprising a preferred optical link topology for the optical circuit switch system based on the received input, converting the optical link topology for the optical circuit switch system into optical circuit switch port mapping, and sending the optical circuit switch port mapping to the optical circuit switch system and to a plurality of packet processing nodes operably connected to the optical circuit switch system.

BRIEF DESCRIPTION OF THE DRAWINGS

Illustrative embodiments are hereinafter described, wherein like reference numerals refer to like elements, in which.

DETAILED DESCRIPTION OF THE PREFERRED EMBODIMENTS

Figure 1:
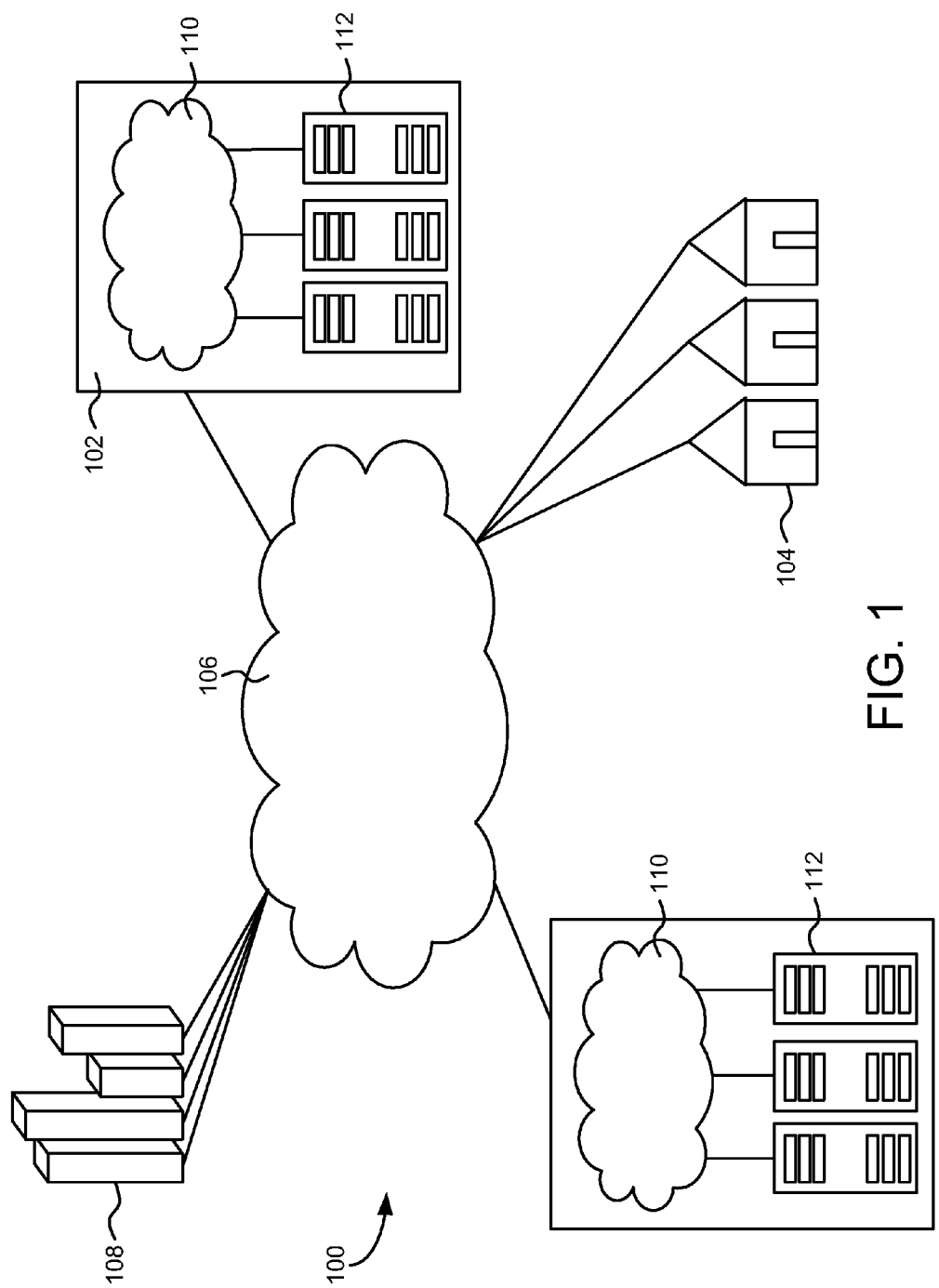
FIG. 1 is an overall system diagram depicting the use of data centers in an Internet network according to one illustrative embodiment.

Before describing in detail the particular improved system and method, it should be observed that the several disclosed embodiments include, but are not limited to a novel structural combination of conventional data/signal processing components and communications circuits, and not in the particular detailed configurations thereof. Accordingly, the structure, methods, functions, control and system of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the disclosed embodiments are not limited to the particular embodiments depicted in the example diagrams, but should be construed in accordance with the language in the claims.

Some embodiments described herein provide dynamic bandwidth and topology requests from applications running on servers and from network operators which are not limited by a manual or static structure. Some embodiments described herein provide more efficient switching and routing at a data center. Some embodiments described herein provide active fault detection troubleshooting and the capability to automatically protect against failures. Some embodiments described herein provide an optical switching system with less need for local on-site access and manual rewiring to expand bandwidth capacity or to recover from connection failures.

Referring to FIG. 1, a general system diagram of an Internet network 100 is depicted connecting to data centers 102, area networks 108 used by individual businesses or various geographic localities, including wide-area networks (WAN) or local area networks (LAN), and individual users 104. Individual users 104 or area network users 108 may use computing, storage and networking infrastructure included in data centers 102. For example, data centers 102 may support client-server interaction, data security, cloud computing services, data storage, data access, data computation, and software access, for example. In general, data centers 102 house a multitude of computer systems used to control Internet data traffic, store Internet data, and provide redundant storage for Internet and server data. Many data centers have a temperature-controlled environment to provide an optimal environment for the functionality of the computing devices housed therein. Additionally, a core goal of a data center is to provide constant Internet connectivity, data storage, and data security. Accordingly, many data centers provide redundant fiber optic and electrical data link cabling as well as back-up power generation in the case of a power outage. Data centers 102 may include a large number of interconnected servers and other computing devices according to one illustrative embodiment. The computing devices housed in may be arranged in repetitive modules or groups that have similar power and cabling requirements. For example, the computing devices may be stored in equal numbers on a series of server racks. The servers and other computing devices may be connected through various switching and routing devices at data center 102 according to one embodiment. Furthermore, switching and routing devices in each data center 102 may be controlled by control software prior to transmitting and receiving data from individual users 104, other data centers 102, or WAN's/LAN's 108.

Figure 2:
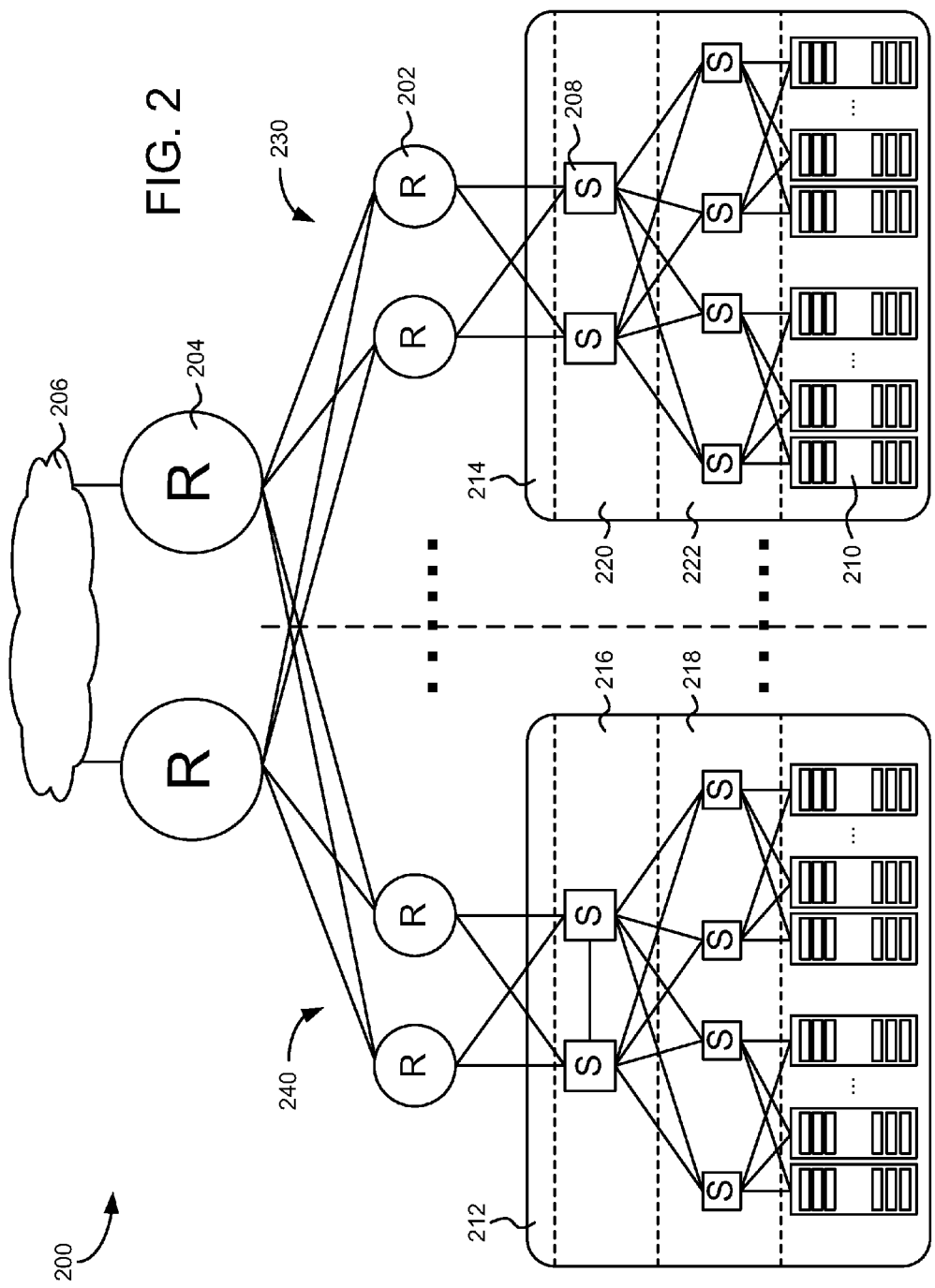
FIG. 2 is a schematic diagram of a network architecture in a data center according to one illustrative embodiment.
Figure 3:
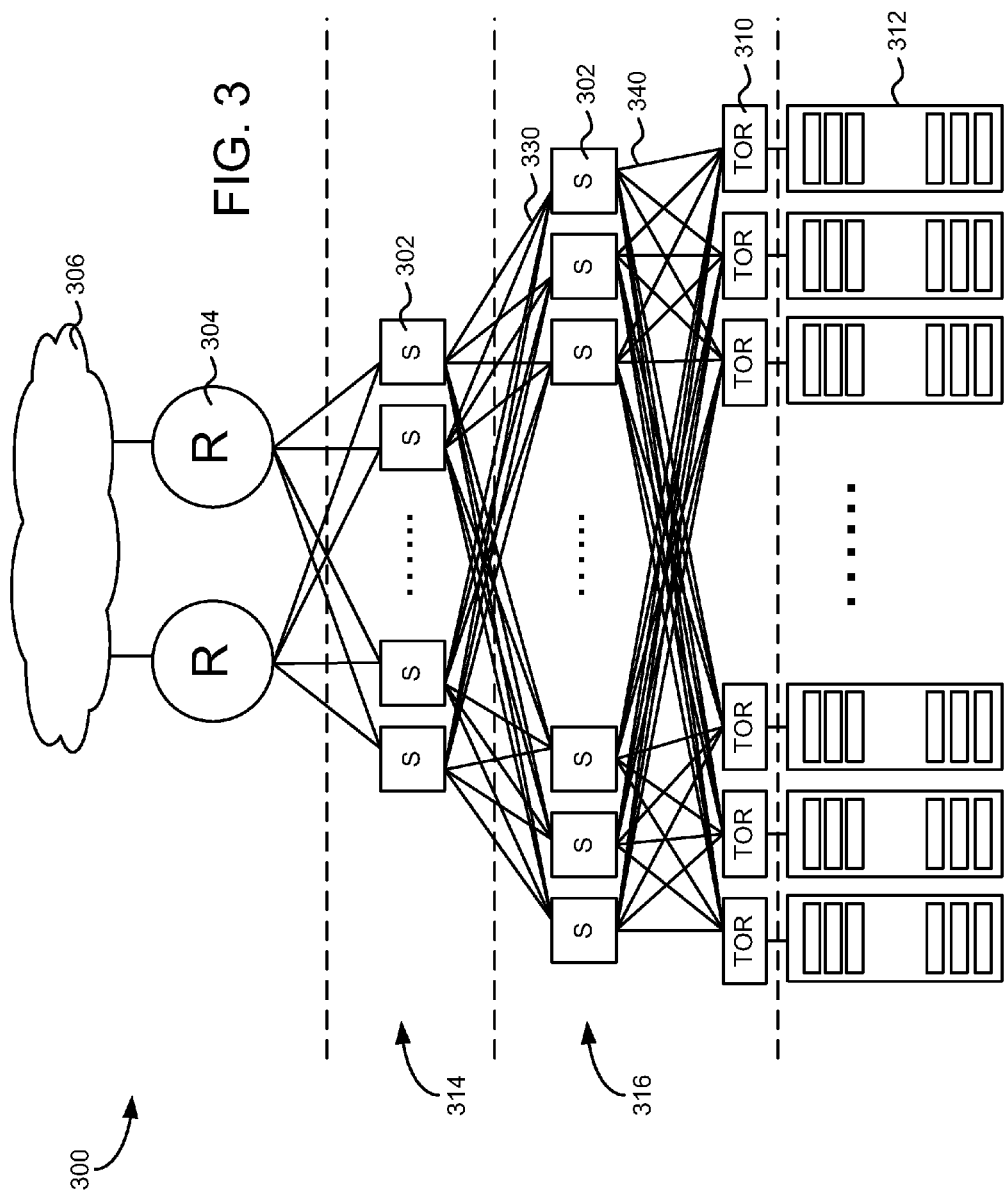
FIG. 3 is a schematic diagram of a network architecture in a data center according to another illustrative embodiment.

Additionally, Internet data and data control information is exchanged between end users 104, 108 and data centers 102 using various switches and routers at data centers 102. The switches and routers within data centers 102 are used to read address information for example, to transmit data to an intermediate or final destination. Accordingly, data centers 102 must transfer a high volume of data between individual computers and the switches and routers. FIG. 2 and FIG. 3 depict two methods of managing data center traffic according to predetermined topologies. Both FIG. 2 and FIG. 3 may interconnect switches 208 and servers 210 using passive fiber patch panels or passive electrical patch panels 212. Patch panels 212 are made of arrays of passive mating connectors, for example.

Accordingly, the network topologies of FIG. 2 and FIG. 3 are built in a manual and static fashion. Because of the various interconnections in patch panel 212 are static and manually installed, data center topologies 200 and 300 are not able to perform automatic fault detection/correction of communication link failures. Furthermore, if the connectivity of a patch panel 212 must be changed to address data link failure, expansion of bandwidth capacity or the like, local on-site access to the data center 102 and manual rewiring of the patch panel 212 is required. This manual process can take several days because of access approval and travel to remote locations, thus leading to and network performance degradation.

Specifically, with respect to FIG. 2, a tree topology 200 is depicted. Tree topologies in general include a series of levels wherein lower levels indicated by sections 218 and 222 that have relatively low bandwidth, low speed switches and higher levels, indicated by sections 216 and 220, that have higher speed, higher bandwidth switches. Tree topology 200, for example, includes a lower level 218, 222 comprising eight switches (labeled "S") and a higher level 216, 220 including four switches (labeled "S"). One disadvantage of a tree topology such as tree topology 200 is that existing switches with fastest port speed such as the four higher level switches shown in FIG. 2, limits the overall network performance in the data center.

An additional disadvantage is that to expand the scope of topology 200, additional servers must be manually installed into switches in the existing topology. This method is known as the "scale-up approach" which has two major drawbacks. First, it requires aggregation to higher-speed, denser switches as its fundamental scaling mechanism. Therefore, it is bounded by switch technologies and their development cycles. Second, computer resources are fragmented by multiple trees such as tree 230 and tree 240 as it limits the overall bisectional bandwidth of the network fabric, which results in poor server-to-server connectivity across different trees, thus impacting the maximum degree of parallelism or overall system performance for large-scale distributed computations within the datacenter.

Some of these problems are addressed by a newer scale-out approach shown in FIG. 3. To be able to provision required bandwidth for dynamically changing computing demands from various applications, the scale-out architecture 300 deploys many network switches 302 in a non-blocking fabric at the scale of an entire datacenter 102. A non-blocking fabric allows any server 312 in a given datacenter 102 to communicate to any other server 312 in the data center 102 with full speed. As seen in FIG. 3, switches 302 in architecture 300 have a data link 340 connected to each server 312 in the data center 102. However, scale out architecture 300 has several other major deficiencies. For example, very large scale data centers 102 may contain upwards of 100,000 servers leading to high volumes of cabling 340 between switches and servers and cabling 330 between switches. Furthermore, non-blocking communication between all servers is not always needed even though it is assumed to be the only way to deliver on-demand bandwidth between arbitrary hosts in the face of any localized congestion.

One common approach to work around these challenges is to oversubscribe the network when moving up layers in the in scale out architecture 300, such as between layer 316 and layer 314. Oversubscription ratio of a network switch 302 may refer to total downlink bandwidth over total uplink bandwidth with respect to a node or switch, for example. For example, each switch 302 in switch layer 316 receives 6 data links from all server groups 312 included in the data center and outputs 4 data links resulting in an oversubscription ratio of 6/4. Accordingly, the larger the oversubscription ratio is, the smaller the average bandwidth is among distributed server groups 312. Therefore, the oversubscription ratio is often a compromise between application performance and overall network fabric cost in scale out architectures such as the one shown in FIG. 3.

With respect to data center networks in FIG. 2 and FIG. 3, both networks have a fixed pre-defined topology with a fixed oversubscription ratio. Such fixed topologies may be advantageous or disadvantageous depending on the type of application or data flow through a given data center 102. For example, applications generating large amounts of bursty inter-cluster traffic would benefit greatly from least oversubscribed or non-blocking network fabric, whereas applications with mostly static localized communication patterns would prefer low latency dedicated communication channels.

Figure 4:
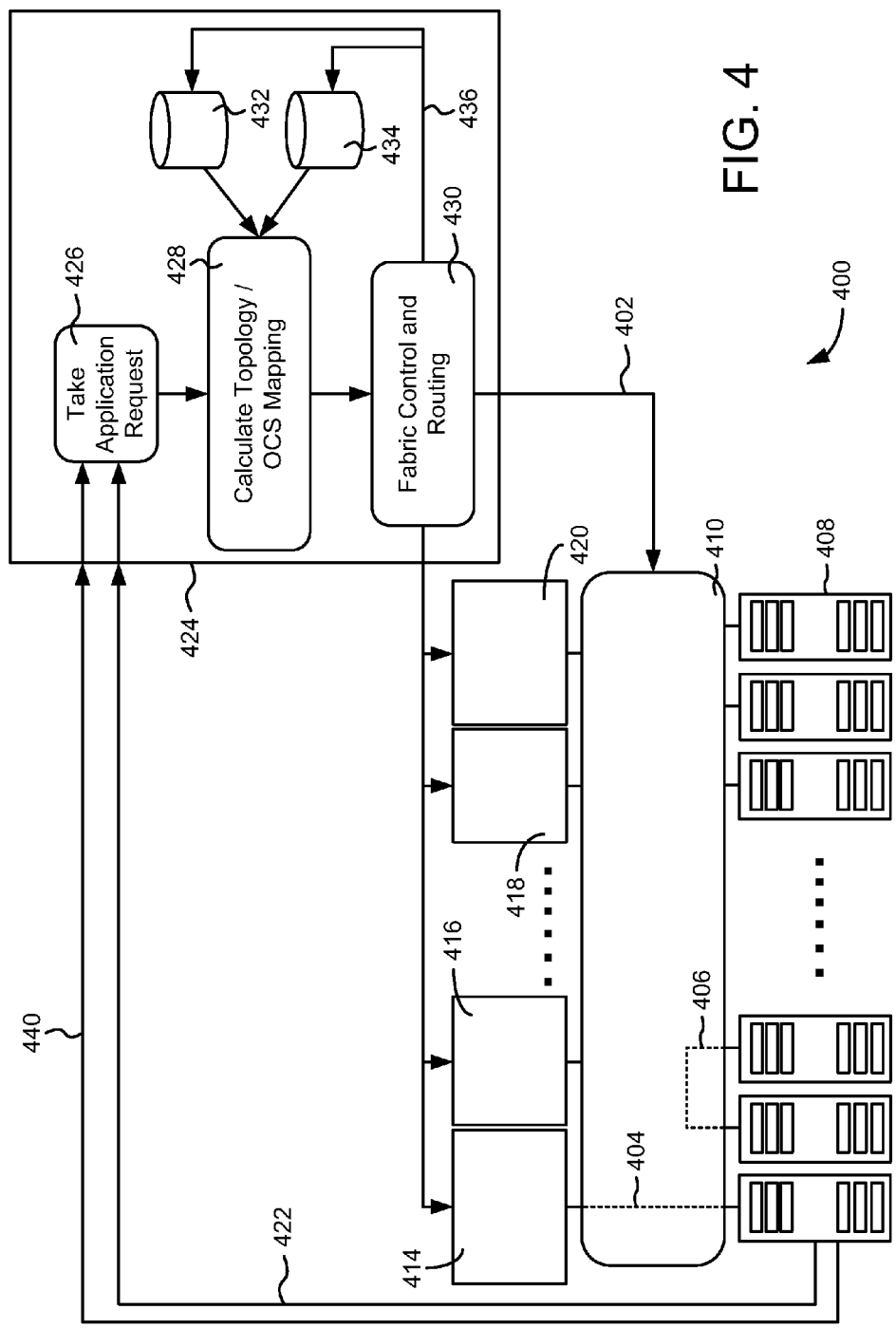
FIG. 4 is a block diagram of an optical circuit switched network architecture in a data center according to one illustrative embodiment.

The data center network 400 depicted in the illustrative embodiment of FIG. 4 provides data center networking that does not have a fixed and predefined topology or a fixed oversubscription ratio like the known topologies depicted in FIG. 2 and FIG. 3. Accordingly, network architecture 400 can provide dynamic optical network topologies to optical circuit switch (OCS) system 410 and dynamic oversubscription ratios to packet processing nodes 414, 416, 418 and 420. In addition to being deployed in a data center 102, network 400 may also be deployed in other fiber rich facilities such as high-degree backbone points of presence (POP) or in other networks.

Furthermore, the dynamic nature of network architecture 400 can provide optimum bandwidth allocation for various front-end applications (social networking, email, search, financial transactions, ecommerce, etc.) and backend applications (such as crawling, indexing, copying etc.) by changing oversubscription ratio and topology based on changing communication patterns. Additionally, optical network or link topology 400 is able to isolate any faulty data links or specific servers that require maintenance.

According to one illustrative embodiment, the optical network topology in OCS system 410 is determined by a network control software at network control module 424. Although shown with particular modules and databases in FIG. 4, the network control module 424 may include any combination of software modules, database modules and controller modules. For example, fabric control and routing module 430 and topology/OCS mapping module 428 may include separate OCS manager and EPS manager modules to independently calculate topology for and control EPS devices 414, 416, 418 and 420 and OCS devices 410. According to one embodiment, the EPS manager could program all EPS devices and receive device and port state updates as well as port and flow counters from EPS devices. An EPS manager may also update the logical topology state cache and the network state database maintained by network control module 424. Furthermore, the OCS manager could implement a calculated topology received from topology/mapping module 428 and monitor all OCS devices. The network control software may reside on one or more computing devices in network control module 424 or embedded in OCS system 410. OCS system 410 is an optical switch with optical ports connected to packet processing nodes 414, 416, 418 and 420 and server groups 408, according to one illustrative embodiment. Server groups 408 may be any set of servers that are associated in some manner. For example, server groups may share a common server network interface or may be grouped in a common server rack.

Packet processing nodes 414, 416, 418 and 420 and server groups 408 are connected to optical ports OCS system 410 by fiber optic cables, according to one embodiment. In one illustrative embodiment, optical circuit switch system 410 is a non-blocking optical circuit switch such that any functional optical port on the optical circuit switch can optically connect with any other functional optical port on the optical circuit switch. Accordingly, OCS system 410 may provide server group 408 to server group 408 connectivity shown in FIG. 4 as optical link 406 as well as server group 408 to processing node 414 connectivity shown as optical link 404, according to one embodiment. Although not shown in FIG. 4, OCS system 410 may also provide packet processing node 418 to packet processing node 420 optical link connectivity, according to one embodiment. Packet processing nodes 414, 416, 418 and 420 may include high performance routers, Infiniband switches, Ethernet switches, commodity top of rack switches, or any other node capable of determining a packet destination, according to one illustrative embodiment.

Figure 5:
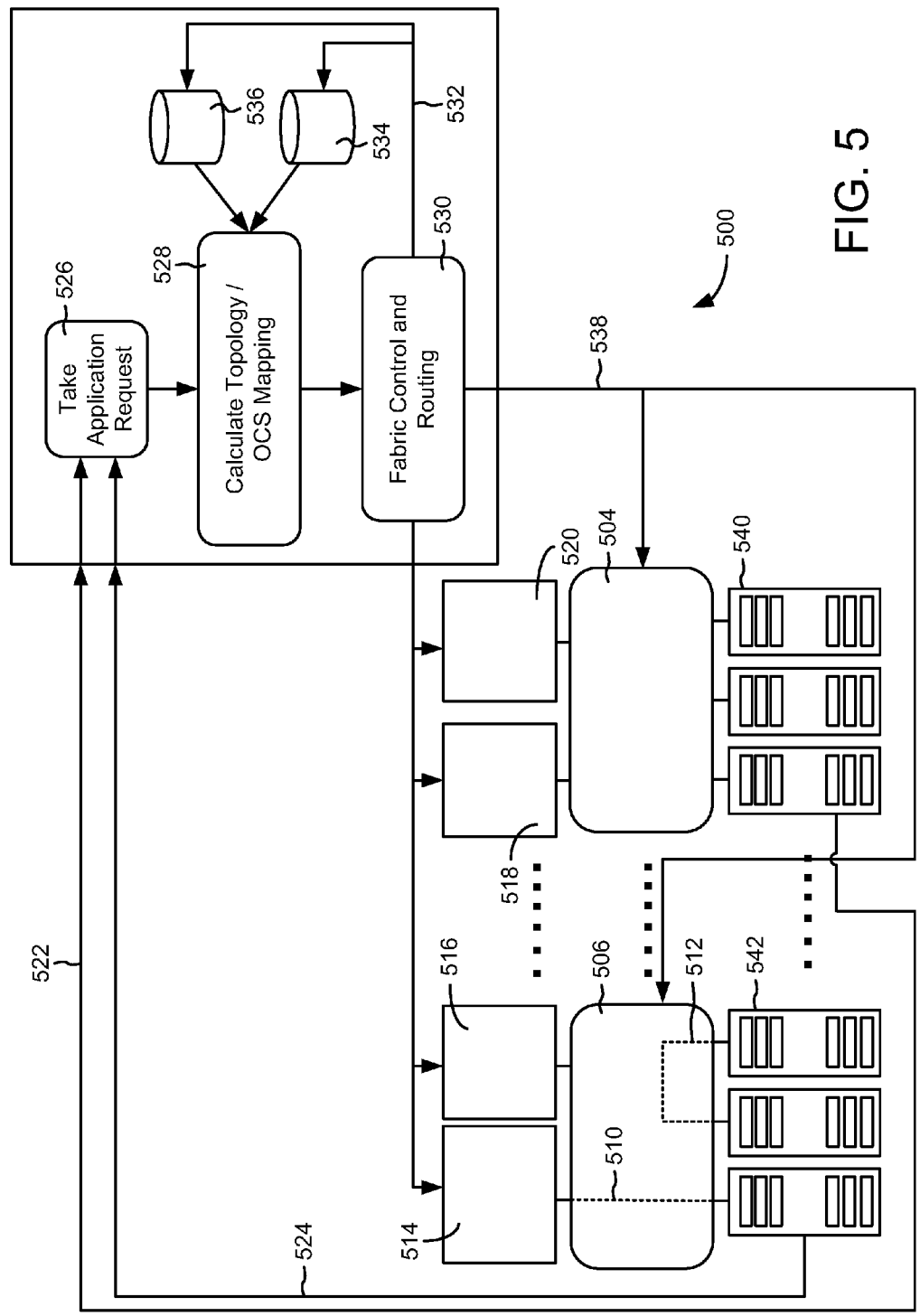
FIG. 5 is a block diagram of an optical circuit switched network architecture in a data center according to another illustrative embodiment.

Furthermore, OCS system 410 as shown in FIG. 4 may be separated into separate OCS modules such as optical circuit switch 506 and optical circuit switch 504 as shown in FIG. 5. With respect to the multiple OCS 504, 506 system shown in FIG. 5, the overall OCS system comprised of at least two OCS modules 504 and 506 may not be non-blocking in the aggregate, according to one embodiment, such that a port associated with server group 540 cannot communicate with the port associated with server group 542. This may be the case even though OCS 506 and OCS 504 are both individually non-blocking OCS's.

Each OCS 410, 506 and 504 may dynamically alter optical link connections such as 404, 406, 510 and 512 between OCS ports using programmable mechanical switching mechanisms or programmable electro-optical switching mechanisms to direct optical links 404, 406, 510 and 512 such as light beams between various optical ports on OCS 410. One type of programmable mechanical switching mechanism that can be implemented in OCS system 410 is a micro-electro-mechanical system (MEMS) technology that uses silicon mirror arrays to steer optical beams 404, 406 in free space between different optical ports. Another approach uses piezoelectric actuators to steer optical beams 404, 406 in free space between different ports, for example.

Figure 6:
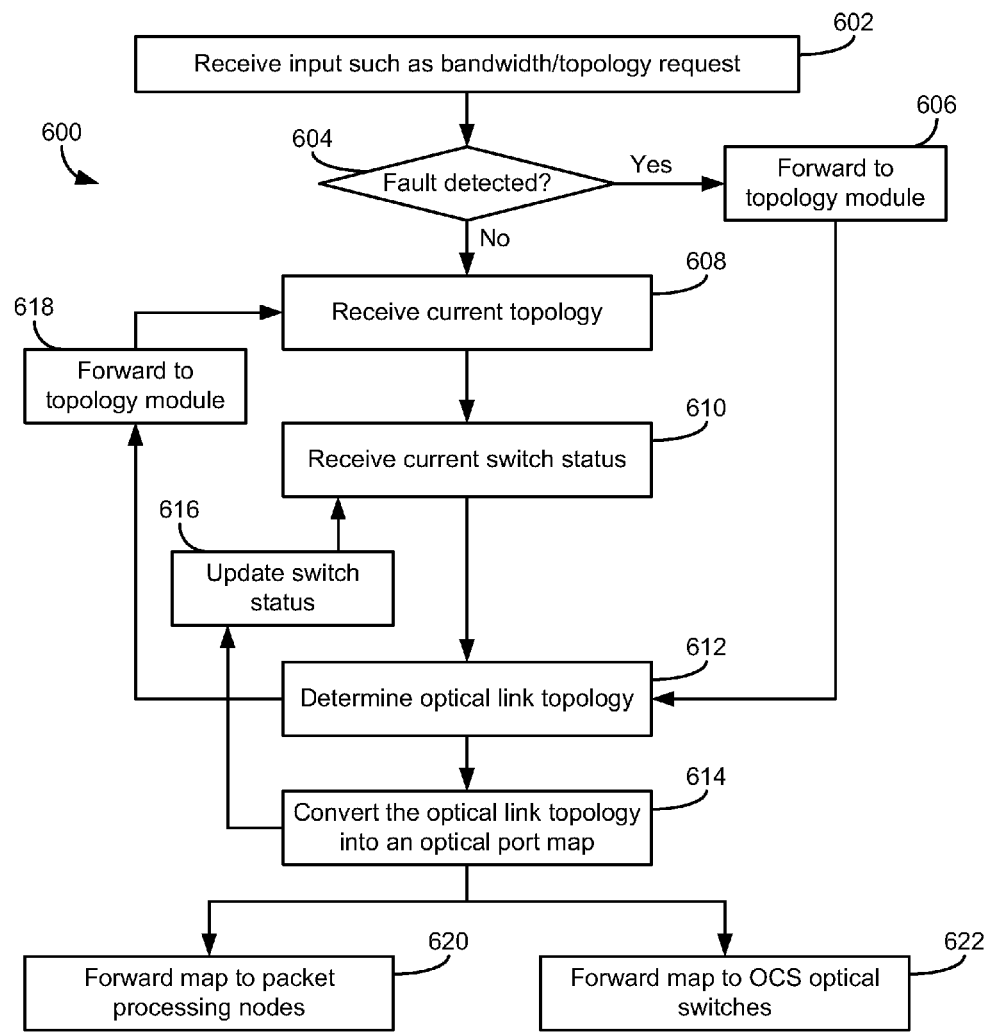
FIG. 6 is a flow chart depicting a process determined by network control software that can be used in an optical circuit switched network according to one illustrative embodiment.

The ports of programmable OCS system 410 may be programmed according to a control signal 402 transmitted from network control module 424, for example. Control signal 402, as well as control signals sent to packet processing nodes 414, 416, 418 and 420 may be determined according to process 600 as shown in FIG. 6. Control signals sent to OCS 410 and packet processing nodes 414, 416, 418, and 420 may include instructions directing programmable devices included therein to implement a preferred optical link topology or a preferred oversubscription ratio. According to one illustrative embodiment, process 600 is controlled by network control software stored in memory and executed by a processing device at network control module 424. At block 602 of process 600, network control module 424 receives bandwidth requests and/or topology requests from a server group 408 or multiple server groups 408, according to one illustrative embodiment. The requests may be sent on data links 440 and 422, for example. Requests 440 and 422 may be generated in response to applications executed on server groups 408 or one or more requests from network operators providing access to server groups 408 for individual users 104 or WAN/LAN users 108.

Once the requests are received at reception module 426 at block 602, the requests may be formatted prior to being input into topology/mapping module 428. As discussed in greater detail below, topology/mapping module 428 may monitor real time communication patterns, estimate Internet traffic, and calculate new topologies or OCS configurations based on traffic data and traffic calculations. According to one illustrative embodiment, topology/mapping module 428 determines a preferred optical link topology for OCS 410 that includes all of the optical data link connections between the input and output ports of OCS 410, such as optical links 404 and 406, for example. The topology/mapping module 428 may also determine a preferred oversubscription ratio for packet processing nodes 414, 416, 418 and 420 that contributes to the overall preferred optical link topology for OCS 410. A particular optical link topology or oversubscription ratio may be determined to maximize efficiency of available resources, give priority to particular applications, or prevent bandwidth bottlenecking at any particular switch or packet processing node, for example.

The preferred optical link topology determined at block 612 is based on one or more inputs as shown in process 600. In addition to the bandwidth and/or topology requests 422 and 440, received at block 602, the preferred optical link topology and oversubscription ratio may be based on the current optical link topology received at block 608 from database 432 and the current switch status received at block 610 from database 434. As seen in FIG. 4, control and routing module 430 provides a feedback loop 436 and stores the current optical link topology in database 432, and the current switch status, such as switch availability at packet processing nodes 414, 416, 418 and 420 in database 434.

According to one embodiment, process 600 may also optionally monitor OCS 410 for optical link faults at block 604. If any optical link faults are detected, they are forwarded to the topology/mapping module 428 at block 606 so that the network control software can exclude faulty links from the preferred optical link topology and/or preferred oversubscription ratio determined at block 612. According to one embodiment, faults are detected at block 604 by a power monitoring mechanism at the optical OCS ports in OCS 410, although any known optical link fault detection methods may be used. Additionally, block 604 may detect ports associated with servers indicated as being upgraded or otherwise under maintenance. Furthermore, optical link topology may also be based on physical network configuration, external requests by network administrators, status of switches, links, ports, and network performance targets based on network or application measurements.

Once a preferred optical link topology for OCS 410 and/or a preferred oversubscription ratio for packet processing nodes 414, 416, 418 and 420 is determined at block 612, the preferred topology and oversubscription ratio are used to determine an optical port map at block 614, according to one illustrative embodiment. The optical port map is determined by translating the preferred optical link topology and preferred oversubscription ratio into a set of OCS port connections corresponding to the optical ports of OCS 410. These port connections are used to program the mechanical or electro-optical switching mechanisms used to direct optical links 404 and 406. Once an optical port map is determined at block 614, the port map is sent to the OCS optical switches by data link 402 at block 622. Furthermore, the port map is also sent to packet processing nodes 414, 416, 418 and 420 so that the packet processing nodes are coordinated with OCS 410. According to one embodiment, process 600 also provides a step for coordinating topology updates between EPS and OCS devices using an update queue. In general, an update queue may be used to ensure that no packet drops occur between OCS and EPS devices and provide for limited bandwidth degradation while implementing newly calculated topologies in the physical structure of the EPS and OCS devices.

In addition, with respect to network control module 424, the one or more computers included therein may comprise one or more processors, that in some embodiments, may be coupled with a bus, and may be configured to process and handle information and execute instructions. Databases in network control module 424 such as database 432 and 434, may be a Random Access Memory (RAM) or other dynamic storage device, may be coupled to the bus, for storing information and instructions to be executed by the one or more processors. The main memory also may be used for storing temporary variables or other intermediate information during execution of instructions by the one or more processors. The one or more processors may be configured for executing one or more sequences of computer-readable instructions contained in the main memory. Such instructions may be read into the main memory from another computer-readable medium, such as a ROM, or other storage device. Execution of the sequences of instructions contained in the main memory will cause the one or more processors to perform the process blocks described herein. It should be appreciated that embodiments may perform fewer or additional processes as compared to those described herein. As noted, the one or more processors may be arranged in a multi-processing system. Alternatively, hard-wired circuitry may be used in place of or in combination with software instructions to implement the invention. Thus, embodiments of the invention are not limited to any specific combination of hardware circuitry and software.

It should be noted that computing devices such as network control module 424 and server groups 408 are illustrated and discussed herein as having various modules which perform particular functions and interact with one another. It should be understood that these modules are merely segregated based on their function for the sake of description and represent computer hardware, circuits and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

The above-described embodiments can be implemented using hardware, software or a combination thereof. When implemented in software, the software code can be executed on any suitable processor or collection of processors, whether provided in a single computer system ("computer") or distributed among multiple computers.

Further, it should be appreciated that a computer may be embodied in any of a number of forms, such as a group-mounted computer, a desktop computer, a laptop computer, a server computer, a cloud-based computing environment, a tablet computer, etc.. Additionally, a computer may be embedded in a device not generally regarded as a computer but with suitable processing capabilities, including a Personal Digital Assistant (PDA), a smart phone or any other suitable portable or fixed electronic device.

The various methods or processes outlined herein may be coded and executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. The recitation of a module, logic, unit, or circuit configured to perform a function includes discrete electronic and/or programmed microprocessor portions configured to carry out the functions. For example, different modules or unit that perform functions may be embodied as portions of memory and/or a microprocessor programmed to perform the functions.

Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

What is claimed is:

1. An optical circuit switch system in a data center that provides a dynamic optical link topology according to topology determinations made by a network control module comprising:
    optical ports on the optical circuit switch system operably connected to a plurality of server groups, wherein the server groups communicate optically with the optical circuit switch system and for each individual server group with at least one server network interface operably connected to the optical circuit switch system, all server network interfaces on individual server groups are operably connected to the optical circuit switch system, and wherein the optical circuit switch system is a non-blocking optical circuit switch system such that any functional optical port on the optical circuit switch system can optically connect with any other functional optical port on the optical circuit switch system;
    optical ports on the optical circuit switch system operably connected to a plurality of packet processing nodes, wherein for each individual packet processing node with at least one port operably connected to the optical circuit switch system, all ports of the individual packet processing node are operably connected to the optical circuit switch system;
    a computing device comprising:
        a memory; and
        a processor to execute network control software stored in the at least one memory to:
            receive input data comprising a bandwidth request;
            determine an output comprising an optical link topology for the optical circuit switch system based on the received input data;
            convert the optical link topology for the optical circuit switch system into optical circuit switch port mapping; and
            send the optical circuit switch port mapping to the optical circuit switch system and to the packet processing nodes.

2. The optical circuit switch of claim 1,
    wherein the processor further executes the network control software to reconfigure an optical switch in the optical circuit switch system based on the optical circuit switch port mapping.

3. The optical circuit switch of claim 2, wherein reconfiguring the optical switch system comprises transmitting a control signal to a MEMS device to alter the orientation of a MEMS mirror.

4. The optical circuit switch of claim 1, wherein the optical circuit switch system comprises a plurality of non-blocking optical circuit switches.

5. The optical circuit switch of claim 1, wherein the bandwidth request is received from at least one server group in the plurality of server groups.

6. The optical circuit switch of claim 1, wherein the input data further comprises the current optical network topology, current port usage, and the current switch connectivity status of the optical circuit switch system.

7. The optical circuit switch of claim 1, wherein the output further comprises a preferred oversubscription ratio.

8. The optical circuit switch of claim 1, wherein the bandwidth request is received from at least one of an application executed on the plurality of server groups and a network operator.

9. The optical circuit switch of claim 1, wherein the packet processing nodes comprise electrical packet switches.

10. The optical circuit switch of claim 1, wherein the packet processing nodes further comprise electrical routers.

11. The optical circuit switch of claim 1, wherein the input data further comprises detection of a faulty optical link between two ports and the output further comprises an optical link topology that does not include the faulty optical link.

12. The optical circuit switch of claim 7, wherein the preferred oversubscription ratio is communicated to the plurality of packet processing nodes.

* * * * *